US007695081B2

(12) United States Patent
Lim

(10) Patent No.: US 7,695,081 B2
(45) Date of Patent: Apr. 13, 2010

(54) IMAGE INPUT/OUTPUT APPARATUS AND METHOD

(75) Inventor: Su-min Lim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 918 days.

(21) Appl. No.: 11/371,069

(22) Filed: Mar. 9, 2006

(65) Prior Publication Data

US 2006/0268027 A1 Nov. 30, 2006

(30) Foreign Application Priority Data

May 26, 2005 (KR) ..................... 10-2005-0044463

(51) Int. Cl.

*B41J 3/00* (2006.01)
*H04N 1/034* (2006.01)
*B41J 2/155* (2006.01)

(52) U.S. Cl. ................................. 347/2; 347/3; 347/42

(58) Field of Classification Search ..................... 347/2, 347/3, 4, 42, 422

See application file for complete search history.

(56) References Cited

U.S. PATENT DOCUMENTS 4,957,689 A 9/1990 Ohnishi et al.
4,965,639 A * 10/1990 Manno et al. ............... 399/262
5,018,025 A * 5/1991 Herloski ..................... 358/471
5,153,736 A * 10/1992 Stemmle ..................... 358/296
5,570,122 A 10/1996 Imamura et al.
5,717,446 A * 2/1998 Teumer et al. ................ 347/35
5,757,389 A * 5/1998 Schwede et al. ............... 347/4
5,909,226 A * 6/1999 Takeda .......................... 347/3
6,519,047 B1 * 2/2003 Ahn .......................... 358/1.12
7,422,305 B2 * 9/2008 Wada .......................... 347/19
2006/0132520 A1 * 6/2006 Bledsoe et al. ................ 347/12

FOREIGN PATENT DOCUMENTS

JP 60141072 A * 7/1985
JP 60141073 A * 7/1985
JP 62-083158 4/1987
JP 05075806 A * 3/1993
JP 08-183223 7/1996
JP 11-215314 2/2001
JP 2001-030544 2/2001
JP 2003-165205 6/2003
KR 2004-102358 12/2004

OTHER PUBLICATIONS

Korean Office Action dated Aug. 24, 2006 issued in KR 2005-44463.

* cited by examiner

*Primary Examiner*—Stephen D Meier
*Assistant Examiner*—Leonard S Liang
(74) *Attorney, Agent, or Firm*—Stanzione & Kim, LLP

(57) ABSTRACT

An image input/output apparatus, and the image input/output apparatus includes an ink-jet head including at least one nozzle unit having a length that is greater than or equal to a width of a recording medium and being movable in a sub scanning direction, and a scanning unit installed on the ink-jet head movable in the sub scanning direction relative to the ink-jet head.

22 Claims, 6 Drawing Sheets

IMAGE INPUT/OUTPUT APPARATUS AND METHOD

CROSS-REFERENCE TO RELATED APPLICATIONS

This application claims the benefit of Korean Patent Application No. 2005-44463, filed on May 26, 2005, in the Korean Intellectual Property Office, the disclosure of which is incorporated herein in its entirety by reference.

BACKGROUND OF THE INVENTION

1. Field of the Invention

The present general inventive concept relates to an apparatus and method of inputting and outputting an image, and more particularly, to an image input/output apparatus and method employing an array ink-jet head.

2. Description of the Related Art

An image input/output apparatus generally includes an input section for reading image information from a document, and an output section for printing an image on a recording medium. The input section is typically one of a document feeding type input unit in which the document is conveyed in a sub scanning direction and a scanning unit is stationary, a flatbed type input unit in which the scanning unit moves in the sub scanning direction and the document is stationary, and a combination type input unit which combines both these types of input units.

Since the image input/output apparatus is spreading from SOHOs (Small Office/Home Offices) to homes, it is necessary to provide a cheap, miniaturized image input/output apparatus.

SUMMARY OF THE INVENTION

The present general inventive concept provides a compact and inexpensive ink-jet image input/output apparatus and a method employing an array ink-jet head.

Additional aspects of the present general inventive concept will be set forth in part in the description which follows and, in part, will be obvious from the description, or may be learned by practice of the general inventive concept.

The foregoing and/or other aspects of the present general inventive concept may be achieved by providing an image input/output apparatus including an ink-jet head including at least one nozzle unit having a length that is greater than or equal to a width of a recording medium and being movable in a sub scanning direction, and a scanning unit installed on the ink-jet head to move in the sub scanning direction relative to the ink-jet head.

The image input/output apparatus may further include a belt facing the at least one nozzle unit to convey the recording medium in the sub scanning direction. The image input/output apparatus may further comprise a negative pressure applying unit to apply negative pressure to the recording medium so that the recording medium does not lift off the belt.

The foregoing and/or other aspects of the present general inventive concept may also be achieved by providing an image forming apparatus, comprising a housing, a scanning surface disposed on a first portion of the housing, a printing surface disposed on a second portion of the housing, and an ink-jet head movable along the printing surface in a movement direction and having a nozzle unit disposed on a bottom surface thereof to face the printing surface and a scanning unit disposed on an upper surface thereof to face the scanning surface.

The foregoing and/or other aspects of the present general inventive concept may also be achieved by providing an ink-jet head usable in an input/output apparatus, the ink-jet head comprising a body that is movable along one or more guides, at least one nozzle unit disposed on a lower surface of the body, and a scanning unit disposed on an upper surface of the body and being independently movable with respect to the body.

The foregoing and/or other aspects of the present general inventive concept may also be achieved by providing a method of inputting/outputting an image in an image input/output apparatus including an ink-jet head having at least one nozzle unit with a length that is greater than or equal to a width of a recording medium and being movable in a sub scanning direction, and a scanning unit installed on the ink-jet head movable in the sub scanning direction relative to the ink-jet head, the method including moving the scanning unit in the sub scanning direction relative to the ink-jet head to read image information of a portion of a document when the ink-jet head is located in an initial position, stopping the scanning unit and moving the ink-jet head in the sub scanning direction to read a remaining portion of the document using the scanning unit, and printing the image on the recording medium using the ink-jet head.

The printing of the image may include stopping the ink-jet head, and conveying the recording medium in the sub scanning direction while printing the image with the stopped ink-jet head.

The printing of the image may comprise returning the ink-jet head to the initial position, and printing the image on the recording medium when the ink-jet head is positioned at the initial position while the recording medium is moved in the sub scanning direction.

The printing of the image may include supplying the recording medium under the ink-jet head positioned at the initial position, printing the image on the stopped recording medium while the ink-jet head is moving in the sub scanning direction so that the scanning unit reads the remaining portion of the document, and stopping the ink-jet head and moving the recording medium in the sub scanning direction to print the image on the recording medium using the stopped ink-jet head.

The printing of the image may include supplying the recording medium under the ink-jet head positioned at the initial position, and printing the image on the recording medium moving in the sub scanning direction while the ink-jet head is moving in the sub scanning direction so that the scanning unit reads the remaining portion of the document.

The foregoing and/or other aspects of the present general inventive concept may also be achieved by providing a method of inputting/outputting an image in an image input/output apparatus including an ink-jet head having at least one nozzle unit with a length that is greater than or equal to the width of a recording medium and being movable in a sub scanning direction, and a scanning unit installed on the ink-jet head movable in the sub scanning direction relative to the ink-jet head, the method comprising moving the ink-jet head in the sub scanning direction to read image information of a portion of a document, stopping the ink-jet head and moving the scanning unit in the sub scanning direction relative to the ink-jet head to read a remaining portion of the document, and printing the image on the recording medium using the ink-jet head.

The printing of the image may include moving the recording medium in the sub scanning direction while the image is printed on the recording medium by the stopped ink-jet head.

The printing of the image may include moving the recording medium in the sub scanning direction, and printing the image on the recording medium by the stopped ink-jet head while the scanning unit is reading the remaining portion of the document.

The foregoing and/or other aspects of the present general inventive concept may also be achieved by providing a method of copying an image in an image input/output apparatus including an ink-jet head having at least one nozzle unit and being movable in a sub scanning direction, and a scanning unit installed on the ink-jet head movable in the sub scanning direction relative to the ink-jet head, the method comprising independently moving the ink-jet head and the scanning unit in the sub scanning direction to scan image information from a document, and printing the scanned image information on a recording medium.

BRIEF DESCRIPTION OF THE DRAWINGS

These and/or other aspects of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
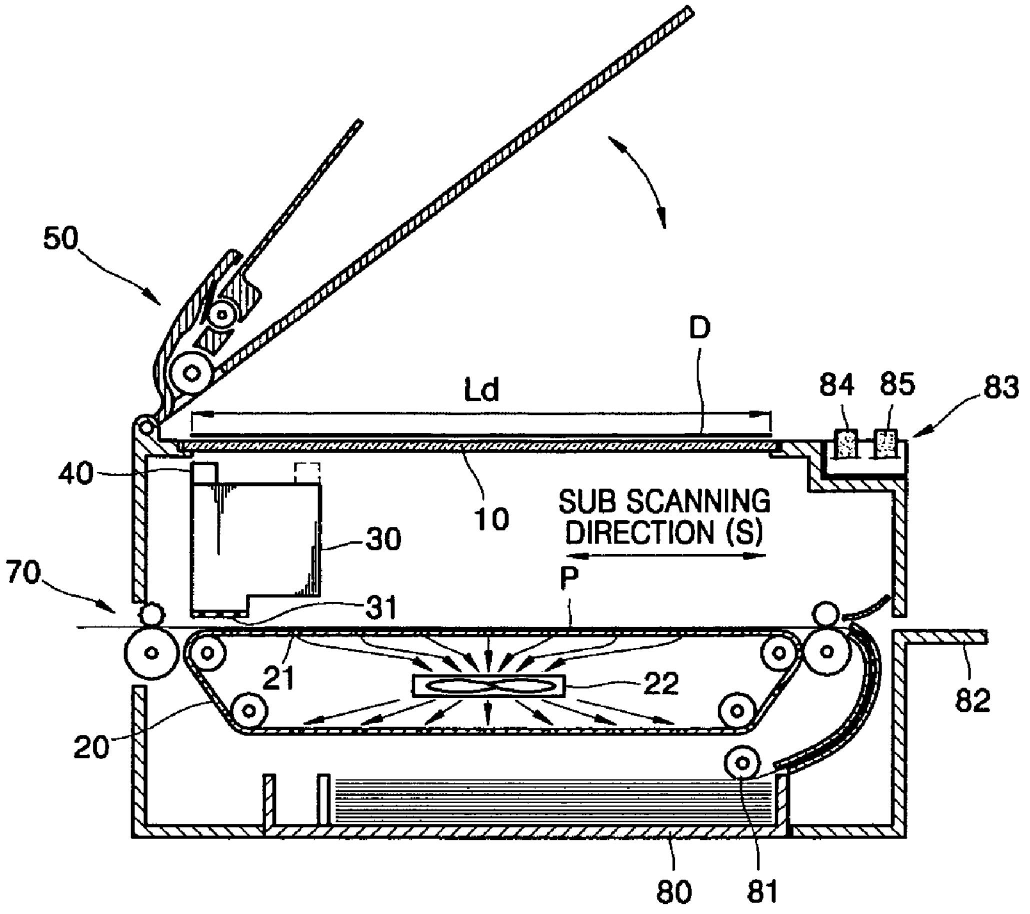
FIG. 1 is a schematic view illustrating an image input/output apparatus according to an embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

FIG. 1 is a perspective view illustrating an image input/output apparatus according to an embodiment of the present general inventive concept. The image input/output apparatus may be a copier, a multifunction image forming apparatus, or the like. Referring to FIG. 1, the image input/output apparatus includes a transparent platen 10 on which a document D is laid, and a conveying belt 20 to convey a recording medium P. An array ink-jet head 30 and a scanning unit 40 are installed between the platen 10 and conveying belt 20. The image input/output apparatus also includes a document conveying unit 50 to convey the document to the platen 10 and a discharging unit 70 to discharge the recording medium P The recording medium P is stacked in a paper feeding cassette 80 and fed one by one by a pickup roller 81. The recording medium P may be fed through a multi-purpose tray 82. The input/output apparatus may further include an operating panel 83 having an image input button 84 and other buttons 85.

Figure 2:
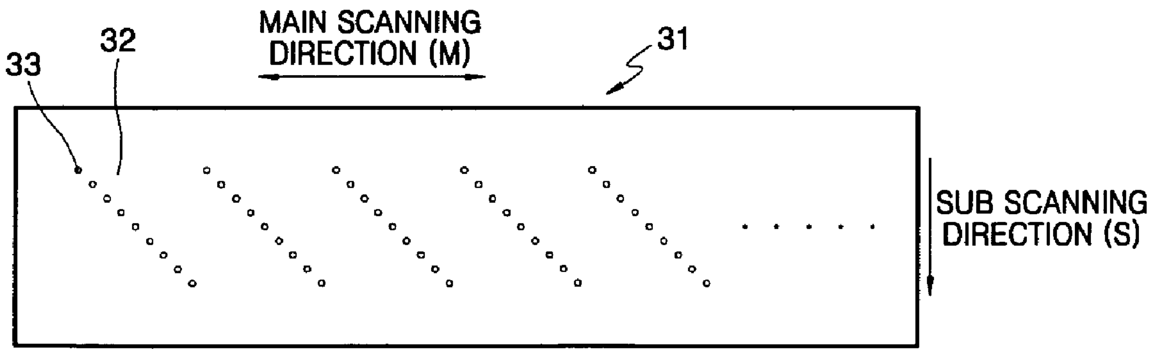
FIG. 2 is a view illustrating an example of a nozzle unit according to an embodiment of the present general inventive concept.

A conventional shuttle-type ink-jet head (not shown) would reciprocate a main scanning direction (indicated by M in FIG. 2) to eject ink droplets onto the recording medium P, whereas the ink-jet head 30 of the present embodiment (i.e., the array ink-jet head 30) includes at least one nozzle unit 31 having a length in the main scanning direction M that is at least equal to a width of the recording medium P. FIG. 2 illustrates an example of the nozzle unit 31. Referring to FIG. 2, arrays 32 of nozzles 33 inclined with respect to the main scanning direction M are arranged in parallel along the main scanning direction M. An interval between the nozzles 33 relative to the main scanning direction M is directly related to a resolution of the apparatus. Although not shown, the ink-jet head 30 includes an ink cartridge to store ink, a chamber to communicate with each nozzle 33 and having a discharging mechanism to supply pressure to discharge the ink (e.g. a piezoelectric device, a heater or the like), and a channel to supply the ink to the chamber. The chamber, the discharging mechanism, and the channel should be known to those skilled in the art, and thus are not described in detail herein. Additionally, it should be understood that nozzle unit 31 illustrated in FIG. 2 is merely exemplary and is not intended to limit the scope of the present general inventive concept.

The scanning unit 40 may employ a contact-type image sensor (CIS) or a charge coupled device (CCD), which is able to input a line image. The CIS and CCD should be known to those skilled in the art, and thus are not described in detail herein.

The conveying belt 20 supports the recording medium P from underneath to maintain a constant spacing between an upper surface of the recording medium P and the nozzle unit 31. This spacing may be about 0.5 to 2.5 mm. The image input/output apparatus also may include a negative pressure applying unit to apply negative pressure to a rear surface of the recording medium P so as to maintain the spacing during a printing process. For example, the negative pressure applying unit includes air vents 21 provided on the conveying belt 20, and a fan 22 under the conveying belt 20. The fan 22 sucks in air through the air vents 21, as illustrated in FIG. 2, to prevent the recording medium P from lifting off the conveying belt 20. In addition, although not shown, various devices, such as a vacuum sucker, may be applied as the negative pressure applying unit. Alternatively, the recording medium P may be adhered to the conveying belt 20 by electrostatic force produced by introducing an electric charge into the recording medium P.

Figure 3:
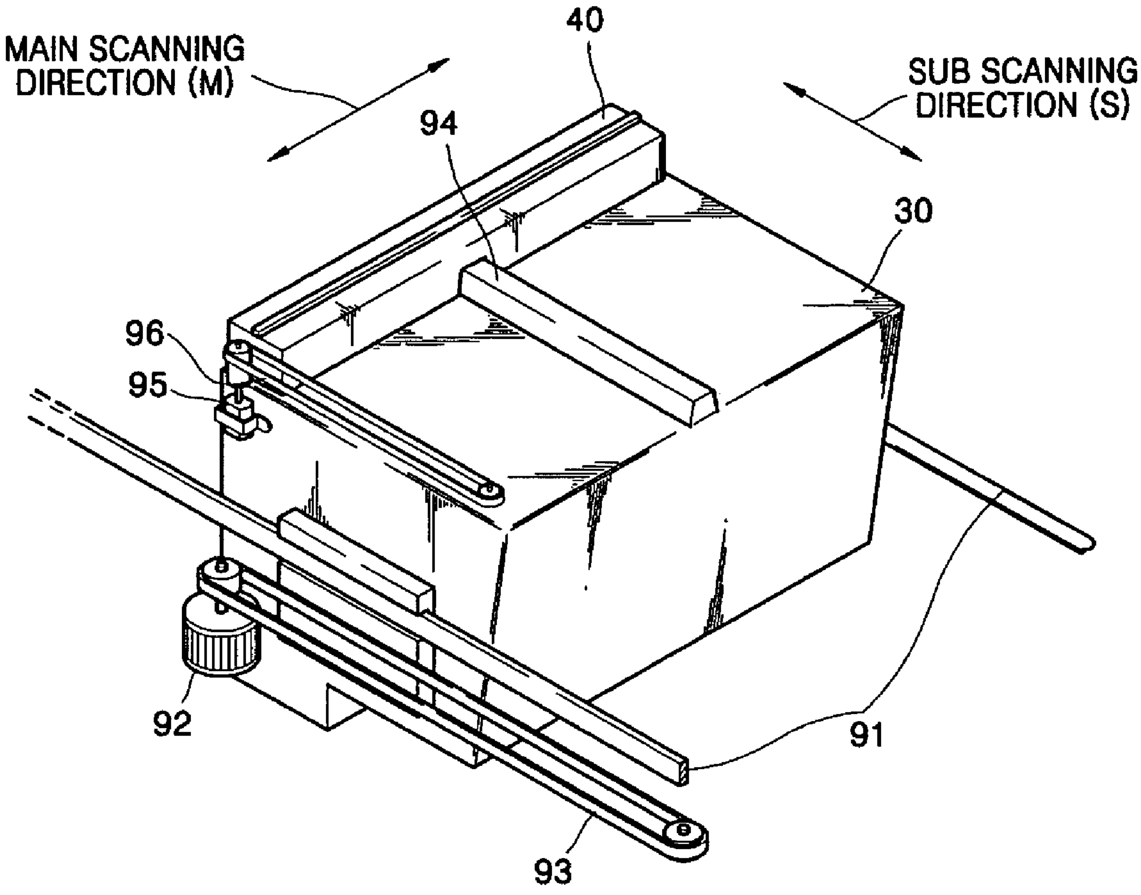
FIG. 3 is a perspective view illustrating a unit to move an ink-jet head and a scanning unit of the input/output apparatus of FIG. 1 in a sub scanning direction according to an embodiment of the present general inventive concept.

The image input/output apparatus of the present embodiment is characterized in that the ink-jet head 30 moves in a sub scanning direction S, and the scanning unit 40 is movably installed to the array ink-jet head 30 in the sub scanning direction S. Referring to FIG. 3, the ink-jet head 30 is supported by guide members 91 installed in the sub scanning direction S. The ink-jet head 30 is coupled to a first timing belt (or wire) 93 which is moved in the sub scanning direction S by a first electric motor 92. Accordingly, the ink-jet head 30 may be reciprocated in the sub scanning direction S by rotating the first motor 92 in both directions. The scanning unit 40 is supported by a guide rail 94 installed on an upper portion of the ink-jet head 30 in the sub scanning direction S. The scanning unit 40 is coupled to a second timing belt (or wire) 96 which is moved in the sub scanning direction S by a second electric motor 95.

Since the scanning unit 40 is installed to the ink-jet head 30, the scanning unit 40 can move together with the ink-jet head 30 in the sub scanning direction S by operating the first motor 92. Additionally, the scanning unit 40 can move relative to the ink-jet head 30 in the sub scanning direction S by operating the second motor 95. Accordingly, the scanning unit 40 is directly installed to the ink-jet head 30, as illustrated in FIG. 3. Hence, the structure in which the ink-jet head 30 is mounted on a carriage (not shown) that can be moved in the sub scanning direction S by the first motor 92 and the scanning unit 40 is movably installed to the carriage in the sub scanning direction S also means that the scanning unit 40 is installed on the ink-jet head 30.

Figure 4:
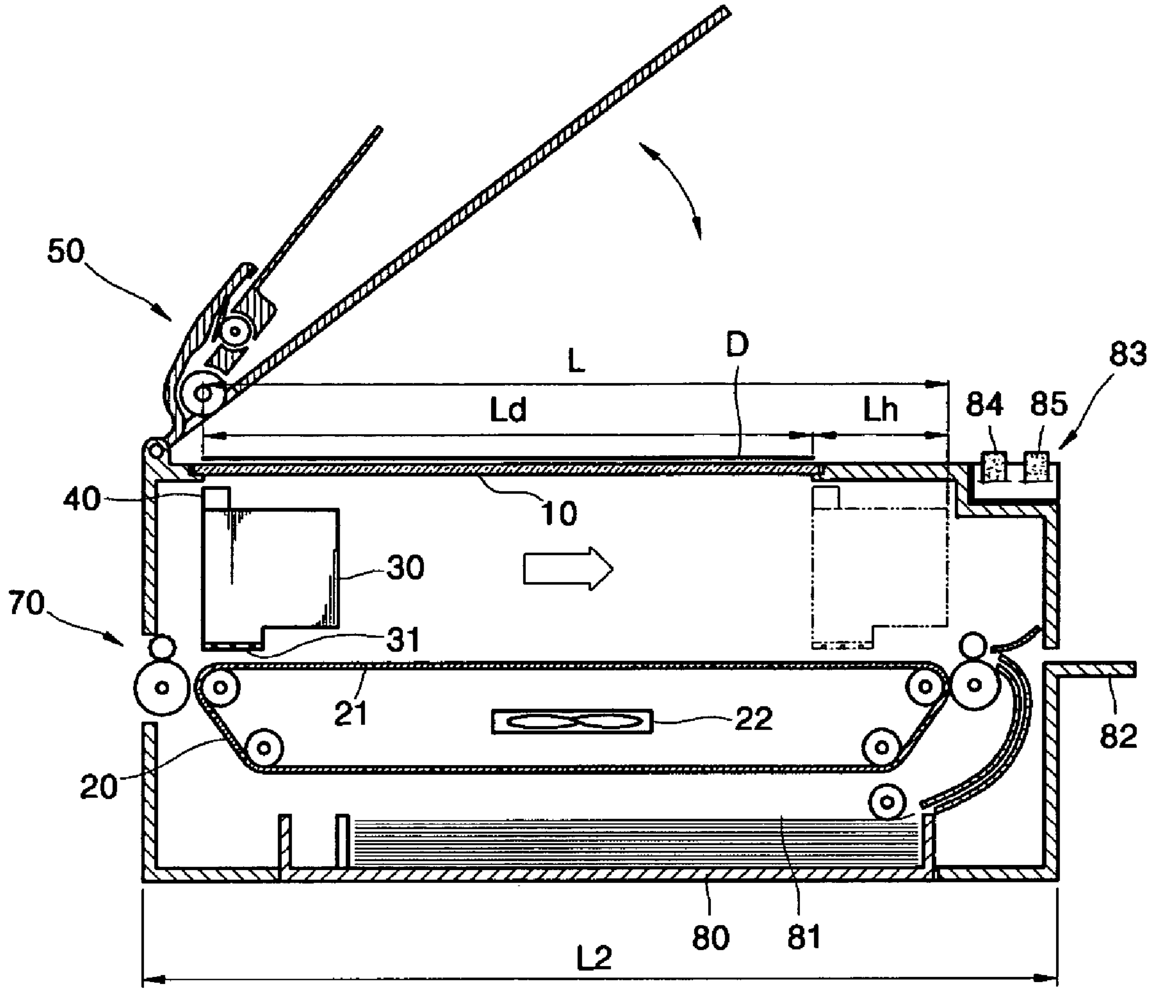
FIG. 4 is a view illustrating a scanning process of a document in which a scanning unit is stationary and an ink-jet head moves in the input/output apparatus of FIG. 1 according to an embodiment of the present general inventive concept.

The array ink-jet head 30 has a length in the sub scanning direction S that is longer than that of the shuttle-type ink-jet head. For example, if the array ink-jet head 30 is capable of printing a color image, then the array ink-jet head 30 may have a length in the sub scanning direction S of about 50 to 100 mm, since the array ink-jet head 30 may have more nozzles that eject various color inks. In order to read the image information from the document D on the platen 10 by using the scanning unit 40 mounted on the ink-jet head 30, the ink-jet head 30 moves in the sub scanning direction S at least as far as a length Ld of the document. In this case, as illustrated in FIG. 4, a space that corresponds to a sum L of the length Ld of the document D and a length Lh of the ink-jet head 30 in the sub scanning direction S should be secured in the image input/output apparatus when the scanning unit 40 does not move relative to the ink-jet head 30. According to the present embodiment, the array ink-jet head 30 may be stationary in a printing operation to print to the recording medium P. However, the array ink-jet head 30 may move together with the scanning unit 40 in a scanning operation to scan the document D placed on the platen 10. If the document D is fed by the document conveying unit 50, the array ink-jet head 30 may be stationary while the scanning unit 40 scans the document D.

Figure 5:
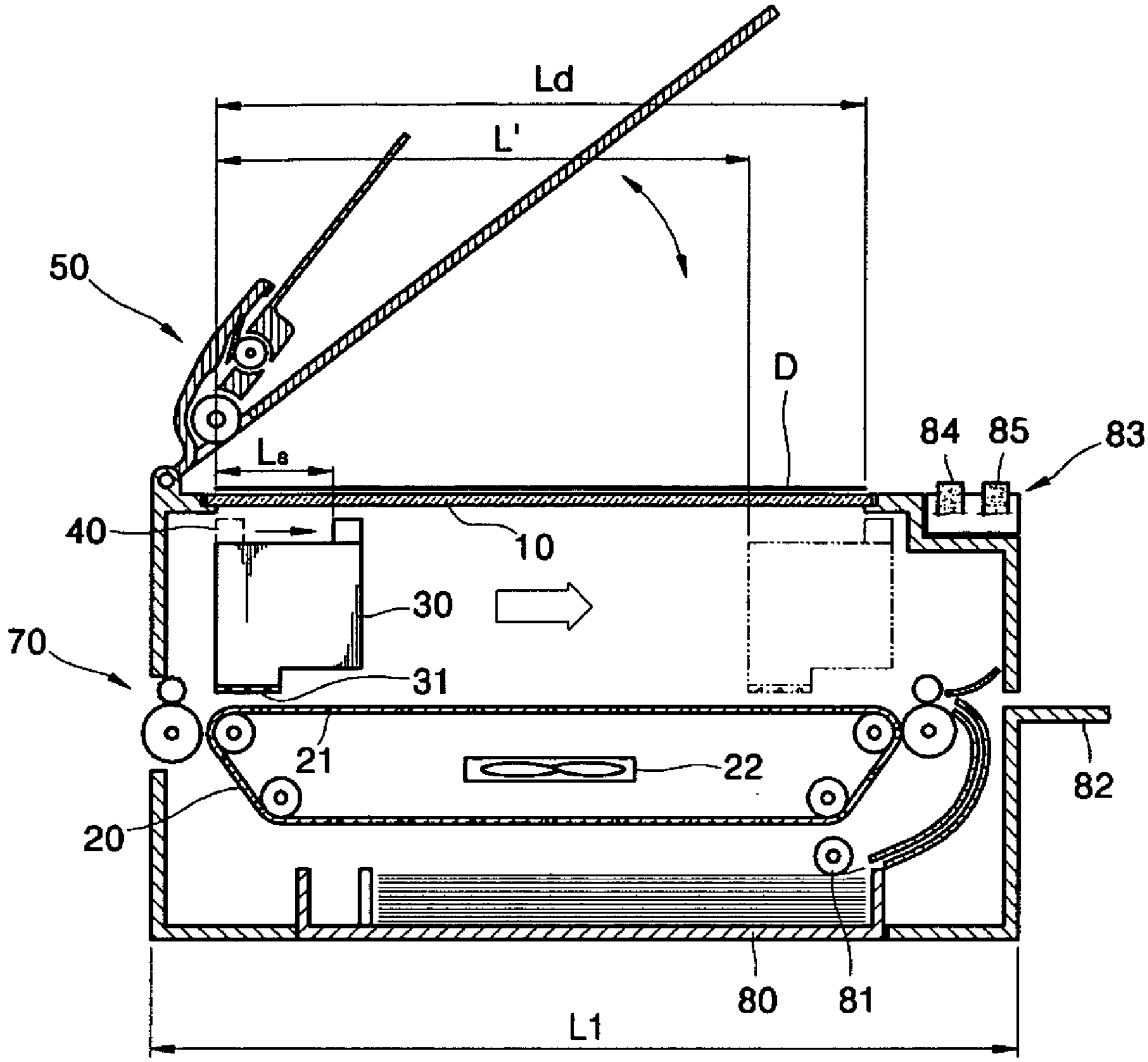
FIG. 5 is a view illustrating a scanning process of a document in which a scanning unit and an ink-jet head both move in the input/output apparatus of FIG. 1 according to an embodiment of the present general inventive concept.

According to the image input/output apparatus of the present embodiment as illustrated in FIG. 5, since the scanning unit 40 is movably installed to the ink-jet head 30 in the sub scanning direction S and is movable relative to the inkjet head 30 using the second motor 95 (see FIG. 3), the ink-jet head 30 may move a distance L' resulting from the subtraction of a movable distance Ls of the scanning unit 40 on the ink-jet head 30 from the length Ld of the document D in the sub scanning direction S. As a result, a length L1 of the image input/output apparatus in the sub scanning direction S illustrated in FIG. 5 becomes shorter than a length L2 of the image input/output apparatus in the sub scanning direction S illustrated in FIG. 4, by the movable length Ls of the scanning unit 40 relative to the ink-jet head 30 in the sub scanning direction S. In other words, since the ink-jet head 30 is movable and the scanning unit 40 is movable relative to the ink-jet head 30, it is possible to reduce a size of the image input/output apparatus by Ls.

A method of inputting and outputting an image using the image input/output apparatus will be now described with reference to FIG. 6 which illustrates an example of an input/output process in the case where the scanning unit 40 and the ink-jet head 30 move in the input/output apparatus of FIGS. 1 to 5 according to an embodiment of the present general inventive concept.

A printing process will be described first. If printing information is input from a host computer (not shown), the pickup roller 81 draws the recording medium P from the paper feeding cassette 80. The recording medium P is conveyed to a bottom of the nozzle unit 31 by the conveying belt 20. The ink-jet head 30 ejects the ink droplets onto the recording medium P conveyed in the sub scanning direction S while in a stationary position, so as to print the image on the recording medium P. The printed recording medium P is discharged by the conveying belt 20 and the discharging unit 70.

Next, a process of scanning the document D will be described. As illustrated in FIG. 6, the ink-jet head 30 is stopped in an initial position. In order to read the image information from the document D, the document D is laid on the platen 10. If a user pushes the image input button 84 of the operating panel 83 or inputs an image input command through the host computer, the second motor 92 rotates, and the scanning unit 40 moves in the sub scanning direction S and to read the image information from the document D. Once the scanning unit 40 moves by the length Ls, the scanning unit 40 stops. Then, the first motor 92 rotates, and the ink-jet head 30 moves by the distance L' in the sub scanning direction S. The scanning unit 40 reads a remaining portion of the document D while the ink-jet head 30 moves in the sub scanning direction S by the distance L'. The scanning unit 40 reads the image information from the document D, for example, by irradiating light onto the document D and detecting reflected light. The image information may be transmitted to a storage unit (not shown) of the host computer, for example. After completing the scanning process, if the first and second motors 92 and 95 rotate in reverse, the ink-jet head 30 and the scanning unit 40 return to their respective initial positions. The ink-jet head 30 may move first by the distance L' in the sub scanning direction S, and then the scanning unit 40 may move by the length Ls in the sub scanning direction S. Accordingly, in the case in which the moving distance L' of the ink-jet head 30 is shorter than the length Ld of the document D, the image information of the document D can be read by using only the scanning unit 40 movably installed on the ink-jet head 30.

Next, a process of copying the document D will be described with reference to FIGS. 1 to 6. The document D is laid on the platen 10. If a user pushes the image input button 84 of the operating panel 83 or inputs a copy command through the host computer, the scanning unit 40 and the ink-jet head 30 may move sequentially to complete the scanning, as described in the scanning process. The pickup roller 81 then draws the recording medium P from the paper feeding cassette 80. The recording medium P is conveyed under the nozzle unit 31 by the conveying belt 20. The ink-jet head 30 ejects the ink droplets onto the recording medium P conveyed in the sub scanning direction S while in a stationary position, so as to print the image obtained from the scanning process performed on the document D on the recording medium P. The printed recording medium P is discharged by the conveying belt 20 and the discharging unit 70. After completing the scanning process, the ink-jet head 30 may return to the initial position, and the image may be printed on the recording medium P by the ink-jet head 30 in the initial position. With the copying process, it is possible to achieve borderless printing such that the image printed on the recording medium P does not have unprinted margins.

Figure 6:
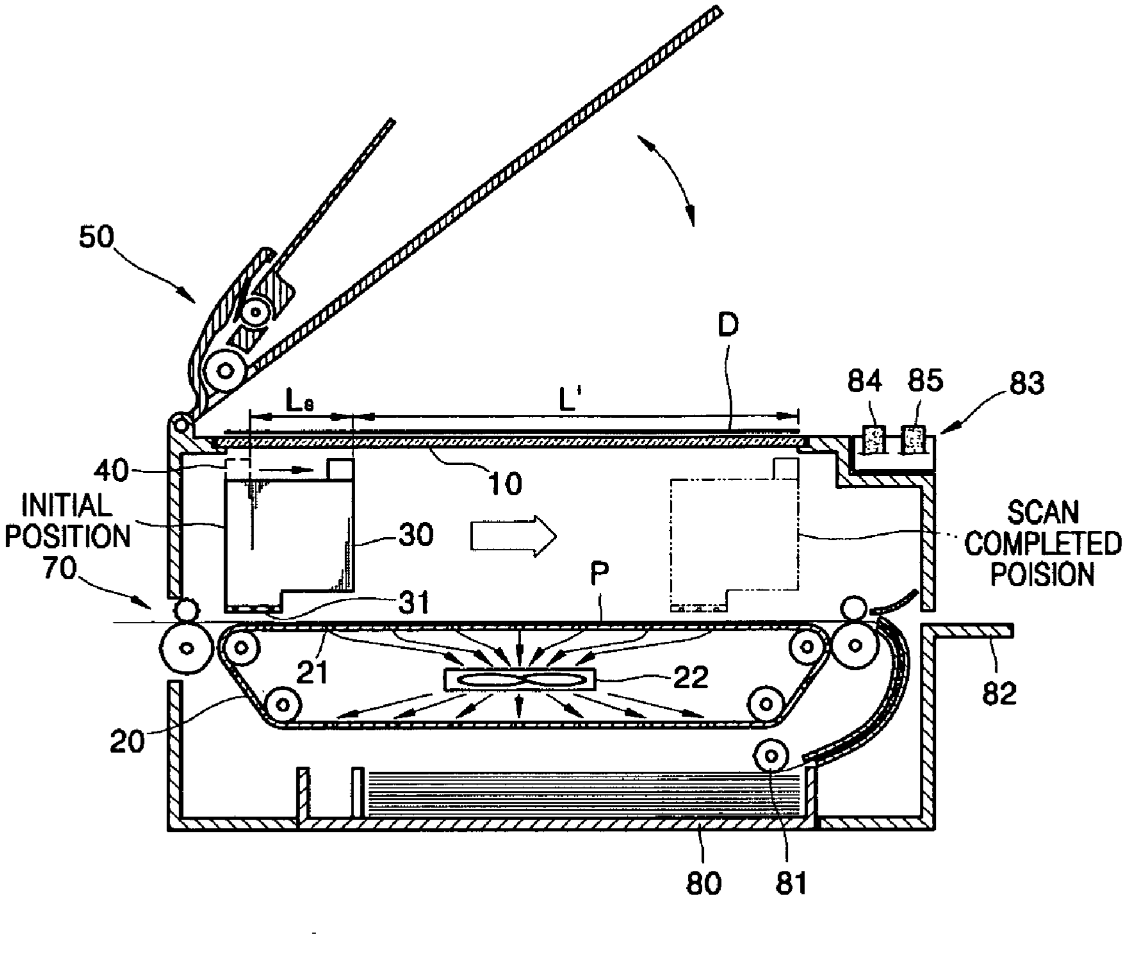
FIG. 6 is a view illustrating an example of an image input/output process in the case where a scanning unit and an ink-jet head both move in the input/output apparatus of FIG. 1 according to an embodiment of the present general inventive concept.

In another copying process, the scanning unit 40 may move by the length Ls to read the image information from the document D, as illustrated in FIG. 6. The information is converted into the printing information for printing, and then stored in a buffer (not shown). The conveying belt 20 supplies the recording medium P, which is picked up from the paper feeding cassette 80 by the pickup roller 81, under the ink-jet head 30 located at the initial position, and is then stopped under the ink-jet 30. While the ink-jet head 30 moves in the sub scanning direction S, the image information is read from the document D by the scanning unit 40, and is simultaneously printed on the recording medium P by the ink-jet head 30. When the ink-jet head 30 reaches and stops at a scan completed position, as illustrated in FIG. 6, the conveying belt 20 conveys the recording medium P in the sub scanning direction S. The ink-jet head 30 ejects the ink droplets onto the recording medium P while in a stationary position to print the image on the recording medium P. According to the copying process of the present embodiment, the copying speed may be increased by performing the scanning and printing processes simultaneously. In addition, since the image information is stored in the buffer prior to the printing process, it is not necessary to convert the image information into the printing information in real time. For example, image information scanned from a portion of the document D that corresponds to the movable length Ls of the scanning unit 40 may be initially stored in the buffer before the printing process is commenced. As the ink-jet head 30 is moved to eject ink on the recording medium P, image information corresponding to a remaining portion of the document D is collected by the scanning unit 40. It is possible that the scanning unit 40 is stationary to scan the document D which is fed by a feeding unit, for example, the document conveying unit 50, while the nozzle unit 31 prints the scanned document D on the recording medium P. In this case, the array ink-jet head 30 does not move. As a result, an inexpensive CPU having a relatively slow processing speed may be employed to convert the image information into the printing information, thereby reducing a cost of the image input/output apparatus.

Figure 7:
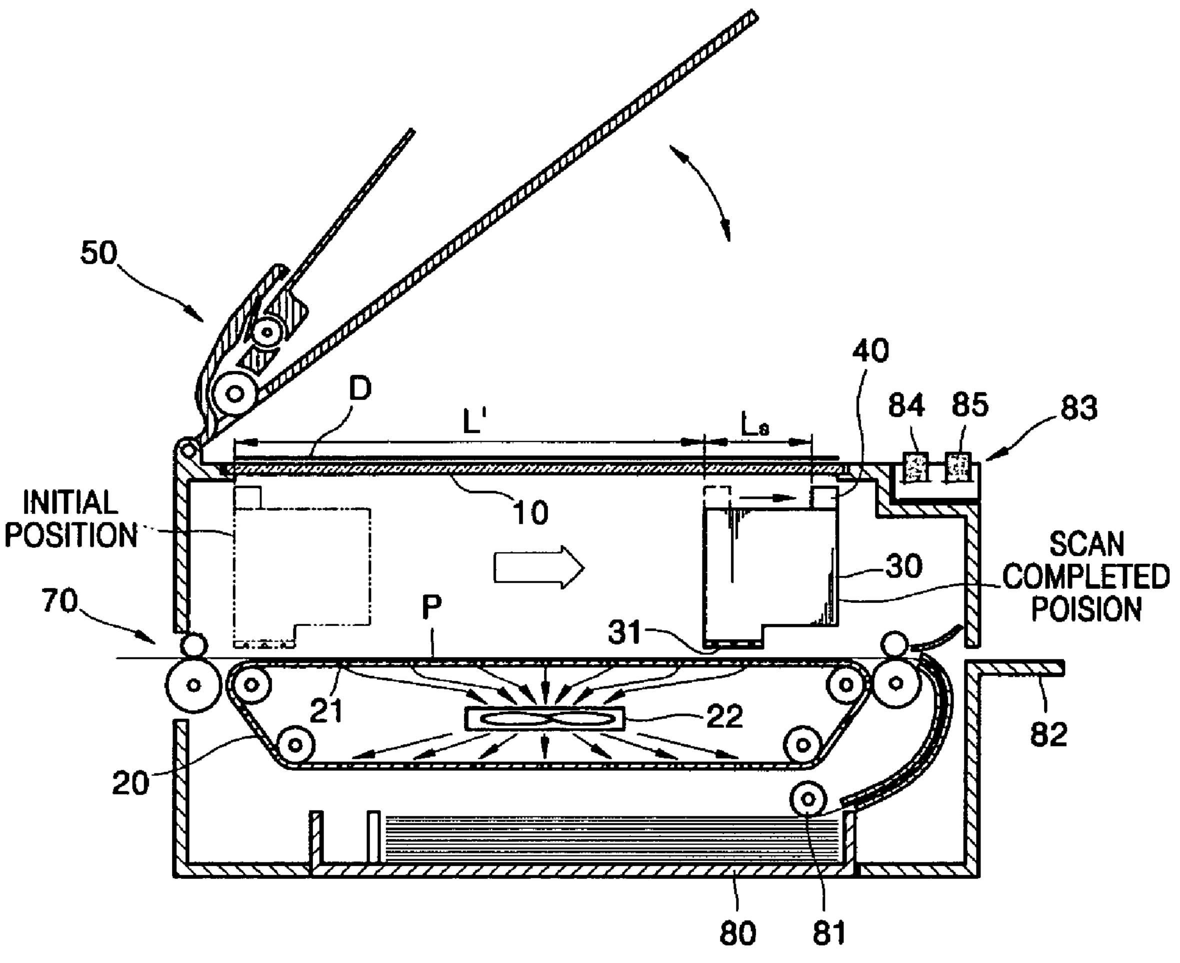
FIG. 7 is a view illustrating another example of an image input/output process in the case where a scanning unit and an ink-jet head both move in the input/output apparatus of FIG. 1 according to another embodiment of the present general inventive concept.

As illustrated in FIG. 7, in the case when the ink-jet head 30 is moved in the sub scanning direction S first, after the recording medium P is supplied to the bottom of the nozzle unit 31 of the ink-jet head 30 positioned at the initial position, the printing process is performed simultaneously with the scanning process. When the ink-jet head 30 stops at the scan completed position, the scanning may be performed by moving the scanning unit 40, and the image may be printed on the recording medium P conveyed in the sub scanning direction S. In this case, a time to convert the input image information into the printing information may be secured by positioning the recording medium P at a position that is slightly deviated from the nozzle unit 31 which is positioned at the initial position.

Referring back to FIG. 6, the image information may be read from the document D by moving the scanning unit 40 by the length Ls. The image information is converted into the printing information, and then stored in the buffer. The conveying belt 20 supplies the recording medium P, which is picked up from the paper feeding cassette 80 by the pickup roller 81, under the ink-jet head 30 positioned at the initial position. The ink-jet head 30 and the recording medium P may move in opposite directions. In this case, movement speeds of the ink-jet head 30 and the recording medium P are controlled so that when the ink-jet head 30 reaches the scan completed position a distal end of the recording medium P is positioned under the nozzle unit 31 to complete the scanning and the printing processes at approximately the same time. When the copying process is performed, since the printing process is performed by using the input image information after the scanning process, the completion of the printing process may be slightly delayed. In this case, after the ink-jet head 30 reaches the scan completed position, only the recording medium P may be conveyed. As a result, the copying speed can be further increased.

With the above image input/output apparatus and methods, it is possible to simultaneously perform the document scanning process and the printing process of the printing information input from the host computer. The above methods may be achieved by storing the image information scanned in the copying (i.e., scanning) process in a memory of the host computer or the image input/output apparatus, and performing the printing process by using the ink-jet head 30 according to the printing information input from the host computer.

In the image input/output apparatus according to various embodiments of the present general inventive concept an ink-jet head is adapted to move in a sub scanning direction, and a scanning unit is installed on the ink-jet head such that the scanning unit is movable relative to the ink-jet head in the sub scanning direction, thereby reducing a size of the image input/output apparatus. Additionally, even though a movement distance of the ink-jet head is shorter than a length of the document, all image information of the document can be read by the scanning unit. The image input/output apparatus can also perform a printing process.

In the image input/output apparatus according to the various embodiments of the present general inventive concept, a scanning process and a copying process are performed simultaneously, thereby increasing a copying speed. In addition, since it is not necessary to convert image information into printing information in real time, an inexpensive CPU having a process speed that is relatively slow may be employed to convert the image information into the printing information, thereby reducing a cost of the image input/output apparatus. In addition, it is possible to simultaneously perform a document scanning process and a printing process of the printing information input from a host computer.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. An image input/output apparatus, comprising:

an ink-jet head including at least one nozzle unit having a length that is greater than or equal to a width of a recording medium and being movable in a sub scanning direction; and a scanning unit installed on the ink-jet head and independently movable in the sub scanning direction relative to the ink-jet head.

2. The image input/output apparatus according to claim 1, further comprising:

a belt displaced to face the nozzle unit to convey the recording medium in the sub scanning direction.

3. The image input/output apparatus according to claim 2, further comprising:

a negative pressure applying unit to apply negative pressure to the recording medium so that the recording medium does not lift off the belt.

4. A image forming apparatus, comprising:

a housing;

a scanning surface disposed on a first portion of the housing;

a printing surface disposed on a second portion of the housing;

an ink-jet head movable along the printing surface in a movement direction and having a nozzle unit disposed on a bottom surface thereof to face the printing surface and a scanning unit disposed on an upper surface thereof to face the scanning surface and independently movable in the movement direction relative to the inkjet head.

5. The image forming apparatus according to claim 4, further comprising:

a conveying belt to convey a recording medium to the printing surface along the movement direction.

6. The image forming apparatus according to claim 4, wherein the nozzle unit comprises a wide array nozzle unit that extends along a width of a recording medium along a non-movement direction that is perpendicular to the movement direction of the ink-jet head, and the scanning unit extends along the non-movement direction.

7. The image forming apparatus according to claim 6, wherein the ink-jet head comprises:

a body that is movable along one or more guides in the movement direction having a bottom surface on which the nozzle unit is disposed an upper surface on which the scanning unit is disposed to be independently movable with respect to the body.

8. The image forming apparatus according to claim 7, wherein the ink-jet head performs a copying operation by moving the scanning unit in the movement direction along a length of the body relative to the ink-jet head to read image information of a portion of a document disposed on the scanning surface when the ink-jet head is positioned at an initial position, stopping the scanning unit at an end of the body and moving the ink-jet head in the movement direction to read a remaining portion of the document using the scanning unit, and printing the image on a recording medium using the nozzle unit.

9. The image forming apparatus according to claim 7, wherein the ink-jet head performs a copying operation by moving the ink-jet head in the movement direction along the scanning surface to read image information of a portion of a document, stopping the ink-jet head and moving the scanning unit in the movement direction along a length of the body relative to the ink-jet head to read a remaining portion of the document, and printing the image on a recording medium using the nozzle unit.

10. The image forming apparatus according to claim 7, wherein the ink-jet head performs a copying operation by moving the scanning unit to scan an initial portion of the document, storing image information of the initial portion of the document in a buffer, and moving the ink-jet head to scan a remaining portion of the document while the nozzle unit performs a printing operation beginning with the stored image information of the initial portion of the document.

11. An ink-jet head usable in an input/output apparatus, the ink-jet head comprising:

a body that is movable along one or more guides;

at least one nozzle unit disposed on a lower surface of the body; and a scanning unit disposed on an upper surface of the body and being independently movable with respect to the body.

12. The ink-jet head according to claim 11, wherein the body is movable along a first direction that roughly corresponds to a document length, and the scanning unit is movable in the first direction that roughly corresponds to a length of the body.

13. A method of inputting/outputting an image in an image input/output apparatus including an ink-jet head having at least one nozzle unit with a length that is greater than or equal to a width of a recording medium and being movable in a sub scanning direction, and a scanning unit installed on the ink-jet head movable in the sub scanning direction relative to the ink-jet head, the method comprising:

moving the scanning unit in the sub scanning direction relative to the ink-jet head to read image information of a portion of a document when the ink-jet head is positioned at an initial position;

stopping the scanning unit and moving the ink-jet head in the sub scanning direction to read a remaining portion of the document using the scanning unit; and printing the image on the recording medium using the ink-jet head.

14. The method according to claim 13, wherein the printing of the image comprises:

stopping the ink-jet head after reading the remaining portion of the document using the scanning unit; and conveying the recording medium in the sub scanning direction while printing the image with the ink-jet head that is stopped at the initial position with the stopped ink-jet head.

15. The method according to claim 13, wherein the printing of the image comprises:

returning the ink-jet head to the initial position; and printing the image on the recording medium when the ink-jet head is positioned at the initial position while the recording medium is moved in the sub scanning direction.

16. The method according to claim 13, wherein the printing of the image comprises:

supplying the recording medium under the ink-jet head positioned at the initial position;

printing the image on the stopped recording medium while the ink-jet head is moving in the sub scanning direction so that the scanning unit reads the remaining portion of the document; and stopping the ink-jet head and moving the recording medium in the sub scanning direction to print the image on the recording medium using the stopped ink-jet head.

17. The method according to claim 13, wherein the printing of the image comprises:

supplying the recording medium below the ink-jet head positioned at the initial position; and printing the image on the recording medium moving in the sub scanning direction while the ink-jet head is moving so that the scanning unit reads the remaining portion of the document.

18. A method of inputting/outputting an image in an image input/output apparatus including an ink-jet head having at least one nozzle unit with a length that is greater than or equal to the width of a recording medium and being movable in a sub scanning direction, and a scanning unit installed on the ink-jet head movable in the sub scanning direction relative to the ink-jet head, the method comprising:

moving the ink-jet head in the sub scanning direction to read image information of a portion of a document;

stopping the ink-jet head and moving the scanning unit in the sub scanning direction relative to the ink-jet head to read a remaining portion of the document; and printing the image on the recording medium using the ink-jet head.

19. The method according to claim 18, wherein the printing of the image comprises:

moving the recording medium in the sub scanning direction while the image is printed on the recording medium by the stopped ink-jet head.

20. The method according to claim 18, wherein the printing of the image comprises:

moving the recording medium in the sub scanning direction and printing the image on the recording medium using the stopped ink-jet head while the scanning unit is reading the remaining portion of the document.

21. A method of copying an image in an image input/output apparatus including an ink-jet head having at least one nozzle unit and being movable in a sub scanning direction, and a scanning unit installed on the ink-jet head independently movable in the sub scanning direction relative to the ink-jet head, the method comprising:

independently moving the ink-jet head and the scanning unit in the sub scanning direction to scan image information from a document; and printing the scanned image information on a recording medium.

22. The method according to claim 21, wherein the moving of the ink-jet head and the scanning unit to scan the image information comprises:

moving the scanning unit to scan an initial portion of the document;

storing image information of the scanned initial portion of the document in a buffer; and moving the ink-jet head to scan a remaining portion of the document while the nozzle unit performs the printing operation beginning with the stored image information of the scanned initial portion of the document.

* * * * *